(12) United States Patent
Ryu et al.

(10) Patent No.: US 12,626,841 B2
(45) Date of Patent: May 12, 2026

(54) SUPERCONDUCTING POWER SUPPLY SYSTEM

(71) Applicant: LS ELECTRIC CO., LTD., Anyang-si (KR)

(72) Inventors: Ki Nam Ryu, Anyang-si (KR); Min Jee Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 185 days.

(21) Appl. No.: 18/282,737

(22) PCT Filed: Feb. 14, 2022

(86) PCT No.: PCT/KR2022/002151
§ 371 (c)(1),
(2) Date: Sep. 18, 2023

(87) PCT Pub. No.: WO2022/196951
PCT Pub. Date: Sep. 22, 2022

(65) Prior Publication Data
US 2024/0170185 A1 May 23, 2024

(30) Foreign Application Priority Data
Mar. 19, 2021 (KR) ........................ 10-2021-0035773

(51) Int. Cl.
*H01B 12/06* (2006.01)
*H01B 12/16* (2006.01)
*H02H 9/02* (2006.01)

(52) U.S. Cl.
CPC ............. *H01B 12/16* (2013.01); *H02H 9/023* (2013.01)

(58) Field of Classification Search
CPC ............ H02H 9/02; H02H 9/023; H05K 7/20; H05K 7/20236; H10N 60/30; F25B 19/00;
(Continued)

(56) References Cited

U.S. PATENT DOCUMENTS 6,354,087 B1* 3/2002 Nakahara ................ H02G 15/34
                                                    62/6
2007/0204632 A1* 9/2007 Lee ........................... F25D 3/10
                                                    62/51.1
(Continued)

FOREIGN PATENT DOCUMENTS

JP        2007221931 A       8/2007
JP        2012217334 A      11/2012
(Continued)

OTHER PUBLICATIONS

International Search Report for related International Application No. PCT/KR2022/002151; action dated Sep. 22, 2022; (2 pages).
(Continued)

*Primary Examiner* — Danny Nguyen
(74) *Attorney, Agent, or Firm* — K&L Gates LLP

(57) ABSTRACT

The present disclosure relates to a superconducting power supply system which may comprise: a superconducting cable connected between terminals; a recovery pipe forming a closed loop with the superconducting cable to recover a liquid coolant of the superconducting cable; a pump for providing a circulating pressure of the liquid coolant through the recovery pipe; a refrigerator for maintaining a temperature by cooling the liquid coolant; and a superconducting fault current limiter for maintaining the temperature of a superconducting element immersed in a supercooled liquid coolant by introducing the liquid coolant recovered through the recovery pipe.

6 Claims, 5 Drawing Sheets

(58) Field of Classification Search
CPC .......... H01F 6/04; H01B 12/16; H01B 12/00;
Y02E 40/60; F25D 3/10
USPC .......................................................... 361/19
See application file for complete search history.

(56) References Cited

U.S. PATENT DOCUMENTS

2017/0038123 A1* 2/2017 Strickland ................. F25B 9/00
2017/0205124 A1* 7/2017 Staines ................. F25B 19/005
2017/0284725 A1 10/2017 Wikus et al.

FOREIGN PATENT DOCUMENTS

| JP | 2013178958 A | 9/2013 |
| JP | 2018189322 A | 11/2018 |
| KR | 20080102157 A | 11/2008 |
| KR | 20180112593 A | 10/2018 |
| KR | 20190041572 A | 4/2019 |

OTHER PUBLICATIONS

Written Opinion for related International Application No. PCT/
KR2022/002151; action dated Sep. 22, 2022; (2 pages).
Office Action for related Korean Application No. 10-2021-0035773;
action dated Dec. 13, 2023; (4 pages).

* cited by examiner

FIG. 4

SUPERCONDUCTING POWER SUPPLY SYSTEM

CROSS-REFERENCE TO RELATED APPLICATION

This application is a National Stage of International Application No. PCT/KR2022/002151, filed on Feb. 14, 2022, which claims priority to and the benefit of Korean Patent Application No. 10-2021-0035773, filed on Mar. 19, 2021, the disclosure of which is incorporated herein by reference in its entirety.

FIELD

The present disclosure relates to a high-temperature superconducting power supply system, and more particularly, to a high-temperature superconducting power supply system using a superconducting cable and a fault current limiter.

BACKGROUND

In general, a superconductor is a material that exhibits zero resistance at a specific temperature and below a specific current, and among them, a material exhibiting superconductivity at 77K or higher, which is the vaporization point of liquid nitrogen used as a coolant, is called a high temperature superconductor (HTS).

The advantage of a superconducting power supply system using a superconducting cable is that it can transmit more than 5 times or more current while using a cable that is ⅓ the thickness of a general power cable. Therefore, it is possible to provide a power grid that can meet the increase in power demand.

In Korean Laid-Open Patent Publication No. 10-2018-0112593 (SUPERCONDUCTING POWER SYSTEM AND REFRIGERANT WITHDRAWING PIPE, published on Oct. 12, 2018) discloses a configuration in which power is supplied using a superconducting cable, but the superconductivity of the superconducting cable is maintained by circulating a liquid refrigerant.

In the above published patent, in order to maintain the temperature of the refrigerant, a recovery pipe in which a multi-layered polymer coating layer having low thermal conductivity is formed on a metal film having high reflectivity is used.

In addition, sensors for detecting the temperature, pressure, and vacuum of the refrigerant using monitoring are added, but there is no special countermeasure against the occurrence of fault current, so supplementation is necessary.

In particular, when an unexpected accident occurs in the power system and a fault current flows in, there is a disadvantage in that it is impossible to respond with the provided monitoring system.

As a different technology, a superconducting fault current limiter has been proposed to respond to fault current in a superconducting power supply system.

As an example of a superconducting fault current limiter, there is Korean Laid-Open Patent Publication No. 10-2008-0102157 (MULTI-BATH APPARATUS AND METHOD FOR COOLING SUPERCONDUCTORS, published on Nov. 24, 2008).

The above superconducting fault current limiter includes a cooling bath for cooling the superconductor and a shield bath surrounding the cooling bath, and controls the pressure so that the cooling bath is maintained in a subcooled state and the shield bath is maintained in a saturated state.

A refrigerator is located on the inner upper part of the shield bath. The refrigerator does not come into contact with the liquid nitrogen in the shield bath, and serves to liquefy the saturated liquid nitrogen again in a phase-changed state to gas.

In addition, a cryogenic storage tank is provided separately, and a configuration for supplying liquid nitrogen to the shield bath to compensate for the liquid level of the shield bath is included.

The combination of the above published patents may use the same cryogenic storage tank and consider a configuration in which a fault current limiter is applied, but it is not easy to maintain the temperature of the superconducting cable and the temperature of the superconducting fault current limiter through each path in the same cryogenic storage tank.

In addition, since the refrigerator should be used for each of the superconducting fault current limiter bodywork and the cryogenic storage tank, problems such as an increase in installation cost and power consumption can be predicted.

SUMMARY

In consideration of the above problems, the present disclosure is directed to providing a superconducting power supply system that adds a superconducting fault current limiter to a superconducting power supply system using a superconducting cable, minimizes installation and operating costs, and is easy to maintain.

More specifically, the present disclosure is directed to providing a superconducting power supply system capable of improving reliability and economy by operating a superconducting fault current limiter without using a refrigerator of the superconducting fault current limiter itself.

The present disclosure is also directed to providing a superconducting power supply system capable of maintaining the pressure of a superconducting fault current limiter.

A superconducting power supply system according to an aspect of the present disclosure for solving the above technical problems may include a superconducting cable connected between terminals; a recovery pipe forming a closed loop with the superconducting cable to recover liquid coolant from the superconducting cable: a pump providing circulating pressure of the liquid coolant through the recovery pipe: a refrigerator that cools the liquid coolant to maintain its temperature; and a superconducting fault current limiter for maintaining the temperature of a superconducting element immersed in a subcooled liquid coolant by introducing the liquid coolant recovered through the recovery pipe.

In an embodiment of the present disclosure, the refrigerator may exchange heat with a part of the recovery pipe at the front end of the superconducting fault current limiter.

In an embodiment of the present disclosure, the superconducting fault current limiter does not use a separate refrigerator.

In an embodiment of the present disclosure, the superconducting fault current limiter may include a first container containing a subcooled liquid coolant in which a superconducting element is immersed, and a second container that surrounds the side and bottom surfaces of the upper side of the first container, and includes an inlet pipe through which a liquid coolant recovered through the recovery pipe flows and an outlet pipe through which an introduced liquid coolant is discharged.

In an embodiment of the present disclosure, the superconducting fault current limiter may include a first container containing a subcooled liquid coolant in which a superconducting element is immersed; and a second container that surrounds the upper side of the first container, and includes an inlet pipe through which a liquid coolant recovered through the recovery pipe flows and an outlet pipe through which an introduced liquid coolant is discharged.

In an embodiment of the present disclosure, the liquid level of the liquid coolant in the second container may be maintained higher than that of the subcooled liquid coolant in the first container due to the heights of the inlet pipe and the outlet pipe.

In an embodiment of the present disclosure, the side area of the first container corresponding to the difference between the liquid level of the liquid coolant and the liquid level of the subcooled liquid coolant may serve as a condensation surface that maintains the internal pressure of the first container by condensing the subcooled liquid coolant when it is vaporized.

In an embodiment of the present disclosure, the height of the condensation surface may be 5 to 30 cm.

The present disclosure can improve safety by applying a superconducting fault current limiter to a superconducting power supply system using a superconducting cable, and also integrate a system for cooling a superconducting cable and a cooling system for a superconducting fault current limiter to simplify the system, reduce cost, and facilitate maintenance.

In addition, the present disclosure has an effect of reducing initial installation cost and operating cost by not using a separate refrigerator for the superconducting fault current limiter.

Furthermore, in a configuration of a fault current limiter including a first container containing a subcooled liquid coolant and a second container surrounding the outside of the first container and containing a saturated liquid coolant, the present disclosure can adjust the heat exchange position between the saturated liquid coolant and the subcooled liquid coolant so that the subcooled liquid coolant circulates itself, thereby increasing temperature uniformity and securing the temperature uniformity of the superconducting element.

In addition, the present disclosure can set the liquid level of the saturated liquid coolant in the second container to be higher than the liquid level of the subcooled liquid coolant in the first container, so that the wall surface of the first container acts as a condensation surface, thereby maintaining the internal pressure of the first container.

BRIEF DESCRIPTION OF THE DRAWINGS

FIGS. 3 to 6 are configuration diagrams of a superconducting fault current limiter applied to the present disclosure, respectively.

<Description of Symbols>

| | |
|---|---|
| 1: superconducting fault current limiter | 2: first terminal |
| 3: superconducting cable | 4: second terminal |
| 5: recovery pipe | 6: pump |

-continued

<Description of Symbols>

| | |
|---|---|
| 7: refrigerator | 10: first container |
| 11: superconducting element | 13: condensation surface |
| 20: second container | 30: third container |

DETAILED DESCRIPTION

Hereinafter, in order to fully understand the configuration and effects of the present disclosure, preferred embodiments of the present disclosure will be described with reference to the accompanying drawings. However, the present disclosure is not limited to the embodiments disclosed below, and may be embodied in various forms and various modifications may be made. Rather, the description of the present disclosure is provided so that the present disclosure will be thorough and complete and will fully convey the scope of the disclosure to those of ordinary skill in the art. In the accompanying drawings, the size of the elements is enlarged compared to actual ones for the convenience of description, and the ratio of each element may be exaggerated or reduced.

Terms such as 'first' and 'second' may be used to describe various elements, but, the above elements should not be limited by the terms above. The above terms may be used only for the purpose of distinguishing one element from another. For example, without departing from the scope of the present disclosure, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present disclosure may be interpreted as meanings commonly known to those of ordinary skill in the art.

Hereinafter, a superconducting power supply system according to an embodiment of the present disclosure will be described in detail with reference to the drawings.

Figure 1:
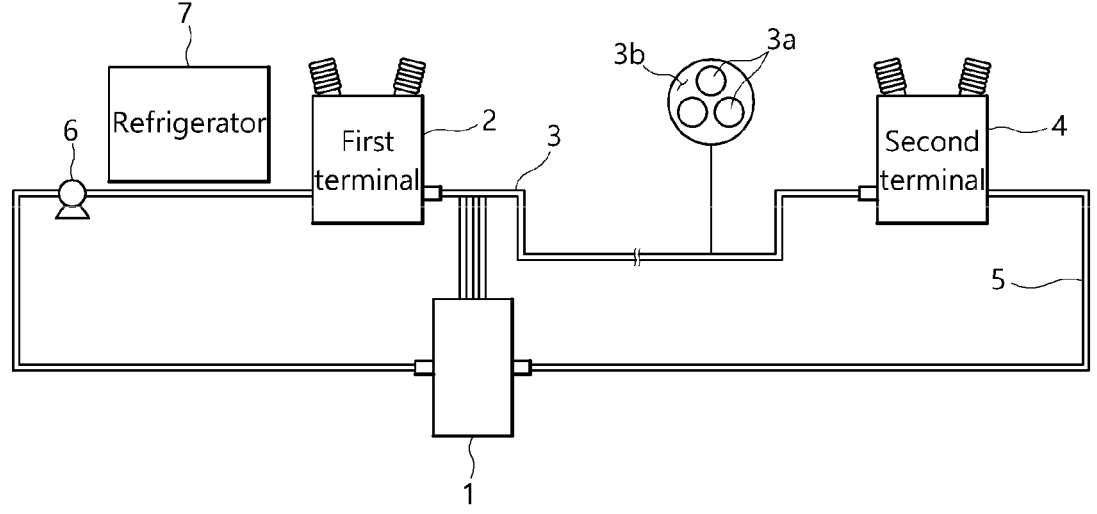
FIG. 1 is a configuration diagram of a superconducting power supply system according to a preferred embodiment of the present disclosure.

FIG. 1 is a configuration diagram of a superconducting power supply system according to a preferred embodiment of the present disclosure.

Referring to FIG. 1, the superconducting power supply system of the present disclosure includes a first terminal 2 and a second terminal 4 forming both ends of the power supply structure using a superconducting cable 3: a recovery pipe 5 for recovering liquid coolant from the second terminal 4 by the pressure of a pump 6: a superconducting fault current limiter 1 for maintaining the temperature of the superconducting element by using the liquid coolant recovered through the recovery pipe 5 and increasing the resistance of the superconducting cable 3 when a fault current occurs; and a refrigerator 7 for cooling the liquid coolant recovered by heat exchange with the recovery pipe 5 and resupplying it to the superconducting cable 3.

Reference numeral 8, which is not explained, is a valve, through which the flow rate flowing to the superconducting fault current limiter 1 can be adjusted to adjust the cooling amount. The flow rate of the liquid coolant passing through the superconducting cable 3 is controlled by the valve 8 so that a portion may pass through the superconducting fault current limiter 1 and the other portion may be bypassed through a bypass pipe.

Hereinafter, the configuration and operation of the superconducting power supply system of the present disclosure configured as described above will be described in more detail.

First, the first terminal 2 and the second terminal 4 are power terminals that form both ends of power supply, and for convenience of description, it is described as supplying power from the first terminal 2 to the second terminal 4, but it may be to supply power from the second terminal 4 to the first terminal 2.

The first terminal 2 and the second terminal 4 are connected by a superconducting cable 3.

FIG. 1 shows a superconducting cable 3 for supplying three-phase power.

That is, the superconducting cable 3 includes three superconductors 3a and a liquid coolant 3b for cooling the superconductors 3a.

As the liquid coolant 3b, liquid nitrogen may be used, and in particular subcooled liquid nitrogen may be used.

The liquid coolant 3b in the superconducting cable 3 is not stagnant, and flows at a constant flow rate from the first terminal 2 side to the second terminal 4 side along the superconducting cable 3 by the pressure of the pump 6.

The recovery pipe 5 is connected between the second terminal 4 and the first terminal 2, and the liquid coolant 3b is recovered to the first terminal 2 through the recovery pipe 5 and supplied to the superconducting cable 3 again.

That is, the liquid coolant 3b is circulated along the closed loop formed by the recovery pipe 5 and the superconducting cable 3 by the pressure of the pump 6.

At this time, the liquid coolant 3b is cooled by the refrigerator 7.

Although omitted in the drawing, the superconducting cable 3 may include various structures for thermal insulation, and the recovery pipe 5 also includes various structures for thermal insulation.

As the thermal insulation structure of the superconducting cable 3 and the recovery pipe 5, various known thermal insulation structures such as vacuum and insulation materials may be used.

The refrigerator 7 may be any one that is heat-exchanged with a part of the recovery pipe 5 to cool the liquid coolant 3b to an appropriate temperature, or collects the liquid coolant 3b recovered through the recovery pipe 5 and then cool the collected liquid coolant 3b.

As shown in FIG. 1, the refrigerator 7 may be located between the pump 6 and the first terminal 2 to cool the liquid coolant 3b through heat exchange with the recovery pipe 5.

Figure 2:
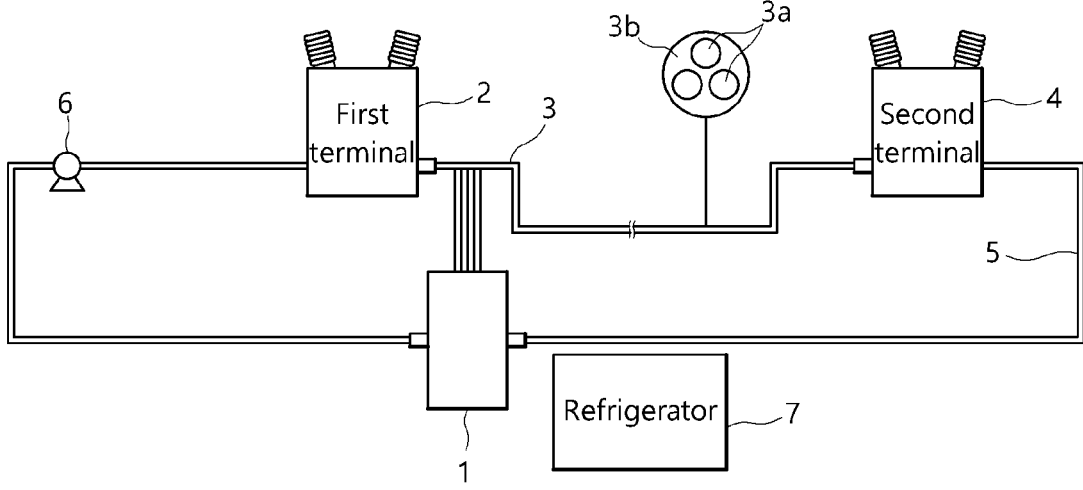
FIG. 2 is a configuration diagram of a superconducting power supply system according to another embodiment of the present disclosure.

FIG. 2 is a configuration diagram of a superconducting power supply system according to another embodiment of the present disclosure, and as shown in FIG. 2, the refrigerator 7 may be positioned in front end of the superconducting fault current limiter 1 to cool the recovered liquid coolant 3b.

In addition, although not shown in FIG. 2, the valve 8 and the bypass pipe shown in FIG. 1 may be applied to FIG. 2.

As described above, the present disclosure allows the superconducting cable 3 to exhibit superconductivity by circulating the liquid coolant 3b, thereby supplying power without loss of power.

At this time, the liquid coolant 3b recovered through the recovery pipe 5 passes through the superconducting fault current limiter 1.

The superconducting fault current limiter 1 serves to change the resistance value of the superconducting element in order to convert the fault current into a level of current that each terminal can handle when a fault current occurs in the process of supplying power.

The superconducting element is electrically connected to the superconductor 3a of the superconducting cable 3.

Figure 3:
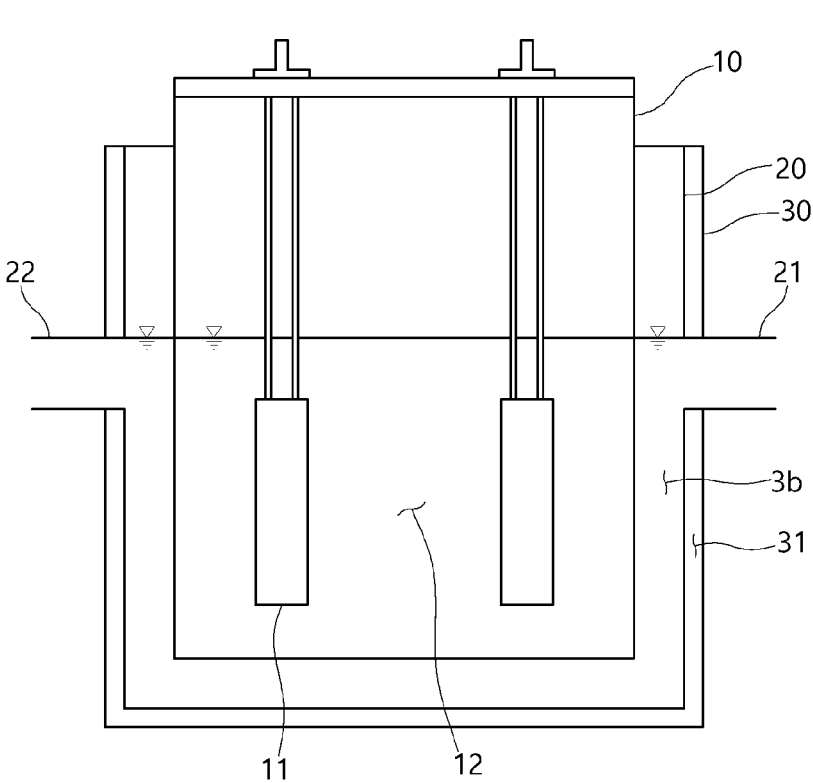

An example of a superconducting fault current limiter applied to the present disclosure is shown in FIG. 3.

Referring to FIG. 3, the superconducting fault current limiter 1 applied to the present disclosure includes a first container 10 accommodating a subcooled liquid coolant 12 in which a superconducting element 11 is immersed: a second container 20 that surrounds the side and bottom surfaces of the first container 10, and includes an inlet pipe 21 into which the liquid coolant 3b recovered through the recovery pipe 5 flows and an outlet pipe 22 through which the introduced liquid coolant 3b is discharged; and a third container 30 that surrounds the side and bottom surfaces of the second container 20 and has a vacuum 31 inside.

The first container 10 provides a cylindrical accommodation space, and has a superconducting element 11 provided therein. The number of superconducting elements 11 may be the same as the number of phases of the power system.

That is, three superconducting elements 11 may be used in a three-phase power system.

The superconducting element 11 is immersed in a subcooled liquid coolant 12 in the first container 10, and the temperature of the superconducting element 11 is maintained by the subcooled liquid coolant 12, so that the resistance of the superconducting element 11 maintains a state close to 0 before a fault current occurs.

The subcooled liquid coolant 12 may be liquid nitrogen.

The internal pressure PI of the first container 10 is 3 bar, and the temperature of the subcooled liquid coolant 12 may be 77K as a normal reference temperature, but this may change depending on the material of the superconducting element 11.

Non-condensable gas is injected to maintain the internal pressure of the first container 10. Examples of the non-condensable gas include gaseous neon and helium, and it can be understood that the space at the upper side of the subcooled liquid coolant 12 of the first container 10 is filled with a mixture of gaseous neon or helium and gaseous nitrogen to maintain pressure.

The subcooled liquid coolant 12 accommodated in the first container 10 is not exchanged unless there is a special reason, and maintains the temperature.

The temperature of the subcooled liquid coolant 12 in the first container 10 is maintained by the liquid coolant 3b supplied to the second container 20.

In particular, in the present disclosure, a separate refrigerator is not used for the superconducting fault current limiter 1.

Therefore, the superconducting fault current limiter 1 can be operated without using an additional refrigerator.

The second container 20 includes an inlet pipe 21 and an outlet pipe 22 connected to the recovery pipe 5, respectively, and the liquid coolant 3b introduced through the inlet pipe 21 exchanges heat with the subcooled liquid coolant 12 accommodated in the first container 10, and serves to maintain the temperature of the subcooled liquid coolant 12.

The heat-exchanged liquid coolant 3b is recovered through the outlet pipe 22 and again through the recovery pipe 5.

Figure 4:
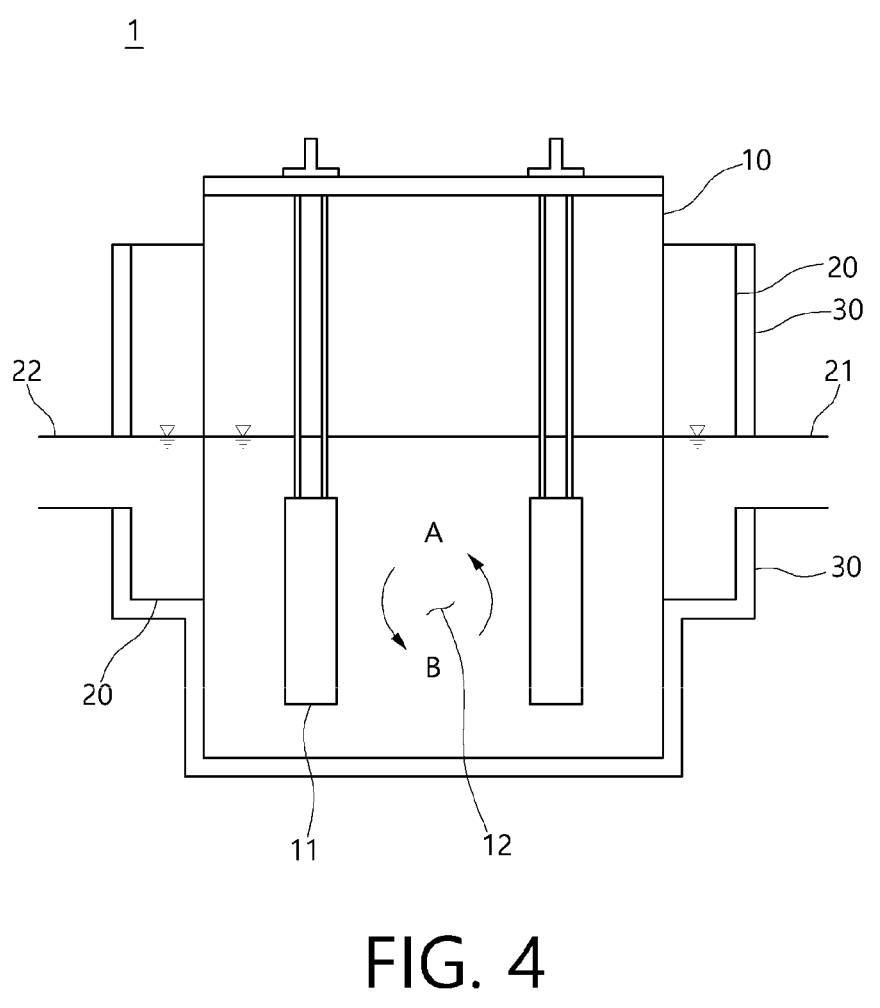

FIG. 4 is a configuration diagram of another embodiment of the superconducting fault current limiter 1.

Referring to FIG. 4, in the superconducting fault current limiter 1 applied to the present disclosure, the second container 20 is positioned around the side surface of the first container 10, but is positioned only on the upper side of the side surface of the first container 10.

The second container 20 may cover about 50% of the height of the side of the first container 10 downward from the upper end of the side. More specifically, it may cover 5 to 30%.

Accordingly, the liquid coolant 3b supplied to the second container 20 exchanges heat with the upper area A of the subcooled liquid coolant 12 accommodated in the first container 10.

The temperature of the upper area A of the subcooled liquid coolant 12 becomes lower than the temperature of the lower area B, and in the subcooled liquid coolant 12, convection occurs due to a temperature difference between the upper area A and the lower area B.

That is, the present disclosure limits the contact surface of the second container 20 and the first container 10 to a part, and induces a partial thermal imbalance in the subcooled liquid coolant 12 inside the first container 10 according to heat exchange, forming convection.

Due to the formation of such convection, the subcooled liquid coolant 12 in the first container 10 circulates itself to achieve temperature equilibrium, and thus temperature uniformity can be improved.

Such temperature uniformity can cool the superconducting element 11 to a uniform temperature as a whole, and by securing the temperature uniformity of the superconducting element 11, resistance uniformity of the superconducting element 11 itself can also be secured.

The third container 30 has a structure that covers both the side surface and bottom surface of the second container 20 and the exposed side surface and bottom surface of the first container 10, and since its inside is in a vacuum 31 state and thus heat transfer is blocked, it is advantageous to maintain the temperature of the subcooled liquid coolant 12 and the liquid coolant 3b of the first container 10 and the second container 20.

Figure 5:
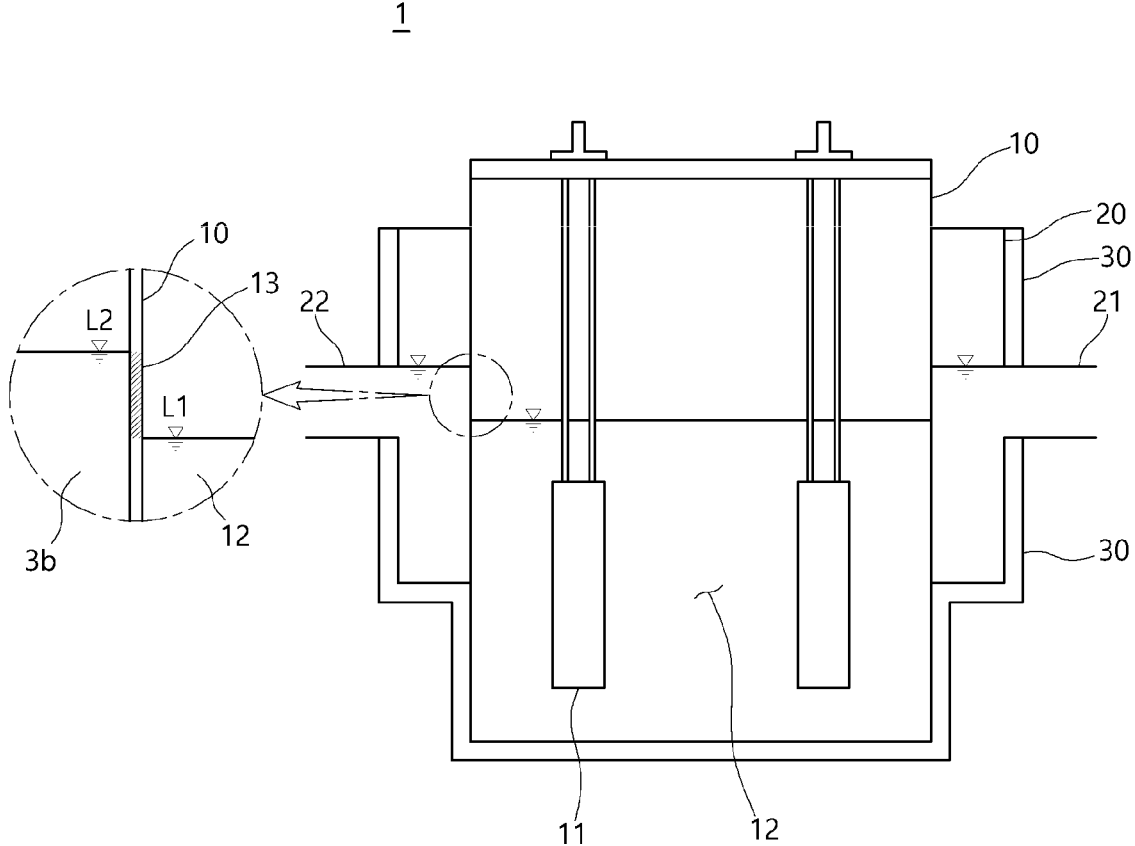

FIG. 5 is a configuration diagram of a superconducting fault current limiter according to yet another embodiment of the present disclosure.

The configuration of another embodiment of the superconducting fault current limiter 1 shown in FIG. 5 includes the first container 10, the second container 20 positioned around a portion of the outer side of the first container 10, and the third container 30 surrounding the side and bottom surfaces of the first container 10 and the second container 20 in the same manner as in the example described with reference to FIG. 4.

However, the heights of the inlet pipe 21 and the outlet pipe 22 of the second container 20 are relatively higher so that the liquid level of the liquid coolant 3b flowing into the second container 20 is maintained higher than that of the subcooled liquid coolant 12 of the first container 10.

A non-condensable gas is injected into the space of the first container 10 on the upper side of the subcooled liquid coolant 12 and maintained at a pressure of 3 bar, and the temperature of the subcooled liquid coolant 12 is maintained at 77K, and when the pressure is 3 bar, the subcooled liquid coolant 12 does not vaporize in theory, but a phenomenon in which the pressure of the first container 10 increases due to the vaporization of the subcooled liquid coolant 12 due to temperature deviation or other reasons may occur.

The change in pressure inside the first container 10 becomes a factor that changes the phase equilibrium as a whole, and it is necessary to keep the pressure constant.

Therefore, as shown in FIG. 5, the liquid level L2 of the liquid coolant 3b in the second container 20 is set to be higher than the liquid level L1 of the subcooled liquid coolant 12 in the first container 10.

A partial area of the outer wall of the first container 10 corresponding to the difference (L2–L1) between the liquid level L2 of the liquid coolant 3b and the liquid level L1 of the subcooled liquid coolant 12 becomes an area having a lower temperature than the other area of the outer wall, which is referred to as the condensation surface 13.

The height of the condensation surface 13, that is, the difference between the liquid level L2 of the liquid coolant 3b and the liquid level L2 of the subcooled liquid coolant 12 is 5 to 30 cm.

If the height of the condensation surface 13 is less than 5 cm, the condensation effect is low, and if it exceeds 30 cm, unnecessary waste of energy may occur.

Therefore, gaseous nitrogen, which is the subcooled liquid coolant 12 vaporized in the first container 10, is condensed on the condensation surface 13 where the temperature is below the condensation temperature, liquefied again, and flows into the subcooled liquid coolant 12 by gravity.

This process continues repeatedly, so that the internal pressure of the first container 10 can be maintained by condensing the subcooled liquid coolant 12 vaporized for other reasons.

Figure 6:
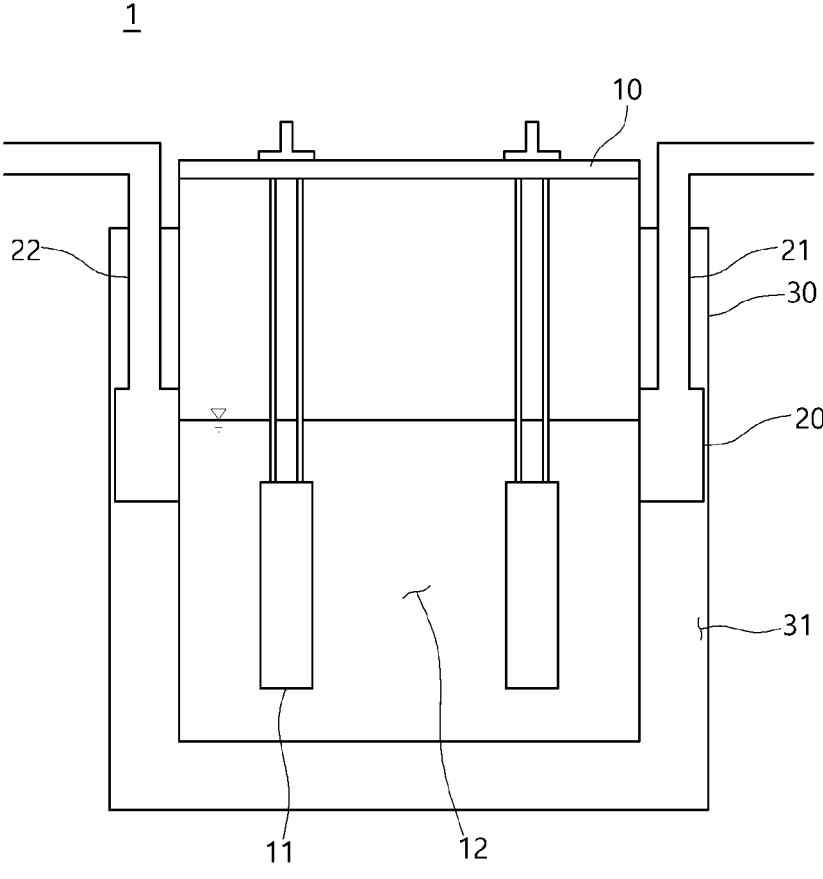

FIG. 6 is a configuration diagram of a superconducting fault current limiter according to another embodiment of the present disclosure.

Referring to FIG. 6, in the superconducting fault current limiter 1, the inlet pipe 21 and the outlet pipe 22 may be formed toward the upper plate side of the superconducting fault current limiter 1 without penetrating the side surface of the third container 30.

Such a structure can further secure the ease of manufacture and relatively reduce the manufacturing cost.

As described above, the liquid coolant 3b accommodated in the second container 20 exchanges heat with the subcooled liquid coolant 12 of the first container 10 and also condenses the subcooled liquid coolant 12 vaporized on the condensation surface 13, and then circulates toward the first terminal 2 through the outlet pipe 22.

As such, the present disclosure can operate a superconducting fault current limiter without using a separate refrigerator, thereby improving the stability of the power supply system and minimizing cost input.

While the present disclosure has been described in connection with what is presently considered to be practical exemplary embodiments, those skilled in the art may understand that the disclosure is not limited to the disclosed embodiments, but, on the contrary, is intended to cover various modifications and equivalent arrangements included within the spirit and scope of the appended claims. Accordingly, the true technical protection scope of the present disclosure shall be determined according to the attached claims.

INDUSTRIAL APPLICABILITY

The present disclosure relates to a technology capable of integrating a system for cooling a superconducting cable and a system for cooling of a superconducting fault current limiter using the laws of nature, and has industrial applicability.

What is claimed is:

1. A superconducting power supply system, comprising:
a recovery pipe forming a closed loop with a superconducting cable to recover liquid coolant from the superconducting cable, the superconducting cable being connected between terminals;
a pump providing circulating pressure of the liquid coolant being circulated through the recovery pipe;
a refrigerator that cools the liquid coolant to maintain its temperature;
a superconducting fault current limiter;
an inlet pipe configured to connect the superconducting fault current limiter with the recovery pipe at a first part of the superconducting fault current limiter, at least a portion of the liquid coolant being introduced to the superconducting fault current limiter through the inlet pipe; and
an outlet pipe configured to connect the superconducting fault current limiter with the recovery pipe at a second part of the superconducting fault current limiter, the liquid coolant introduced to the superconducting fault current limiter being discharged to the recovery pipe,
wherein the superconducting fault current limiter comprises:
a first container containing a subcooled liquid coolant in which a superconducting element is immersed; and
a second container configured to accommodate the introduced liquid coolant and surround the first container such that the introduced liquid coolant is in contact with the subcooled liquid coolant through an outer wall of the first container,
wherein at least a portion of the liquid coolant is introduced to an outer wall of the first container and exchanges heat with the subcooled liquid coolant through the outer wall of the first container, wherein a liquid level of the liquid coolant in the second container is higher than that of the subcooled liquid coolant in the first container, and
wherein a side area of the first container corresponding to a difference between the liquid level of the liquid coolant and a liquid level of the subcooled liquid coolant is a condensation surface that maintains an internal pressure of the first container by condensing the subcooled liquid coolant when it is vaporized.

2. The superconducting power supply system of claim 1, wherein the refrigerator exchanges heat with a part of the recovery pipe at a front end of the superconducting fault current limiter.

3. The superconducting power supply system of claim 1, wherein the superconducting cable and the superconducting element are sequentially cooled by the liquid coolant cooled by the refrigerator, the liquid coolant being commonly used for both the superconducting cable and the superconducting element.

4. The superconducting power supply system of claim 1, wherein the second container is configured to accommodate the introduced liquid coolant and surround the first container such that the introduced liquid coolant is in contact with an entirety of the subcooled liquid coolant, except for an upper surface, through the outer wall of the first container.

5. The superconducting power supply system of claim 1, wherein the second container is configured to accommodate the introduced liquid coolant and surround the first container such that the introduced liquid coolant is in contact with a part of an upper side of the subcooled liquid coolant through the outer wall of the first container.

6. The superconducting power supply system of claim 1, wherein a height of the condensation surface is 5 to 30 centimeters (cm).

* * * * *